United States Patent [19]
Broberg

[11] Patent Number: 5,746,461
[45] Date of Patent: May 5, 1998

[54] BIRD FEEDER HANGING DEVICE SYSTEM

[76] Inventor: James Broberg, 2819 Oak Ridge Rd., Crystal Lake, Ill. 60012

[21] Appl. No.: 766,227

[22] Filed: Dec. 12, 1996

[51] Int. Cl.⁶ .................................................. B25J 1/04
[52] U.S. Cl. .......................... 294/19.1; 294/85; 248/340
[58] Field of Search .............................. 294/19.1, 22–24, 294/85; 248/339, 340, 343

[56] References Cited

U.S. PATENT DOCUMENTS

| | | |
|---|---|---|
| 179,471 | 7/1876 | Campbell . |
| 281,832 | 7/1883 | Bryan . |
| 351,932 | 11/1886 | Mitchell . |
| 520,706 | 5/1894 | Redmond . |
| 579,333 | 3/1897 | Smith ................................. 294/19.1 |
| 650,589 | 5/1900 | Randle . |
| 704,222 | 7/1902 | Stowell ............................... 294/19.1 |
| 734,180 | 7/1903 | Kanaly . |
| 831,066 | 9/1906 | Hawks . |
| 909,729 | 1/1909 | Wollam . |
| 1,262,525 | 4/1918 | Leszczynski . |
| 1,550,438 | 8/1925 | Hohmann . |
| 1,625,673 | 4/1927 | Nelson . |
| 2,496,851 | 2/1950 | Bochau . |
| 2,508,974 | 5/1950 | Soditch . |
| 2,565,978 | 8/1951 | Meriwether . |
| 2,576,705 | 11/1951 | Spitz ................................... 294/19.1 |
| 2,624,201 | 1/1953 | Thomson . |
| 2,842,822 | 7/1958 | Bennett . |
| 2,943,581 | 7/1960 | Bendik . |
| 3,178,144 | 4/1965 | Kimoto . |
| 3,590,780 | 7/1971 | Dunbar . |
| 3,692,269 | 9/1972 | Hales . |
| 3,985,327 | 10/1976 | Holtz . |
| 4,068,817 | 1/1978 | Berger ................................. 248/340 |
| 4,098,483 | 7/1978 | Pesola et al. . |
| 4,153,286 | 5/1979 | Piper et al. . |
| 4,188,913 | 2/1980 | Earl et al. . |
| 4,225,108 | 9/1980 | Jaroche .............................. 294/19.1 |
| 4,669,232 | 6/1987 | Wyatt . |
| 4,887,785 | 12/1989 | Blaich . |
| 4,917,050 | 4/1990 | Clarke . |
| 5,105,765 | 4/1992 | Loken . |
| 5,149,036 | 9/1992 | Sheehan . |
| 5,181,683 | 1/1993 | Smith ................................. 248/339 |
| 5,364,050 | 11/1994 | Smith . |
| 5,553,905 | 9/1996 | Bentivegna . |
| 5,613,719 | 3/1997 | Anderson .......................... 294/19.1 |

FOREIGN PATENT DOCUMENTS 537581  5/1959  Belgium .............................. 294/19.1

OTHER PUBLICATIONS

Packaging From "Easy Lift Hanger", No Date.

*Primary Examiner*—Dean Kramer
*Attorney, Agent, or Firm*—Niro, Scavone, Haller & Niro

[57] ABSTRACT

A device that promotes the safer handling and attachment of an object to an overhead support by providing a positioning pole and hanger that uses a rotatable U-shaped catch that works in conjunction with a stop located on the hanger to maintain the object in a vertical position during the attachment operation irrespective of the pole's position with respect to the object.

1 Claim, 3 Drawing Sheets

BIRD FEEDER HANGING DEVICE SYSTEM

BACKGROUND OF THE INVENTION

The present invention relates to a combination of devices which may be used to attach an animal and bird feeders, bird houses, hanging flower baskets, and other objects to an elevated supporting object, such as a tree limb or hook located on a deck or house. More particularly, the invention improves known hanging devices by providing a rotatable catch mechanism that maintains the object in a vertical position during the placement of the object. This, in turn, promotes safer handling of the object during positioning by keeping the object, which is often laden with several pounds of material, securely retained in the catch mechanism; it also prevents the material contained in the object from shifting during handling.

SUMMARY OF THE INVENTION

My invention, therefore, is directed to a hanging system, and more particularly, a hanging system that is safer to use than systems currently in use. The invention promotes safer handling of objects to be placed above the ground by providing a pole that employs a catch mechanism that maintains positive contact with the hanger and attached object. The catch mechanism also maintains the hanger and attached object in a vertical position during installation, irrespective of the pole's position with respect to the hanger and object. This also improves the safety of the system by preventing the contents of the object from shifting during installation, which may cause the unintentional release of the hanger and object from the pole resulting in injury to the user. Or, in situations where the vertical axis of the object is not maintained, the hanger and object may accidently disengage from the pole, which, again, may cause injury to the user or result in damage to the object.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

DETAILED DESCRIPTION OF THE PREFERRED EMBODIMENTS

Figure 1:
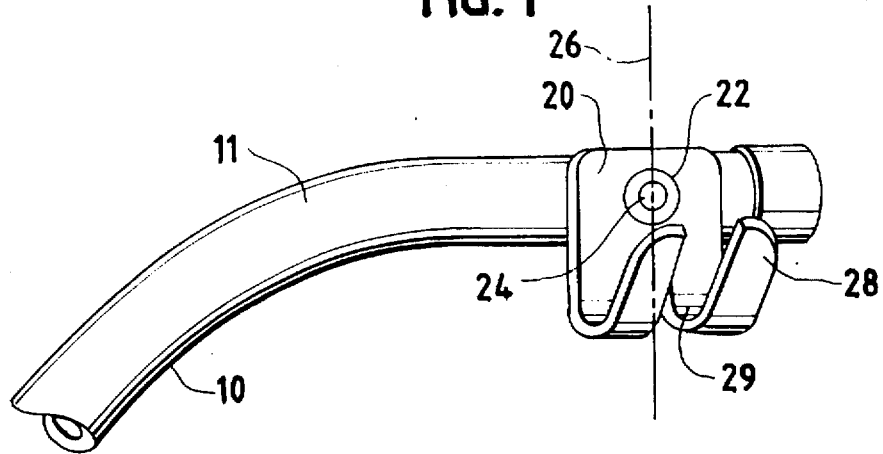
FIG. 1 is a partial perspective view of one embodiment of the invention showing the pole and rotatable catch mechanism.
Figure 4:
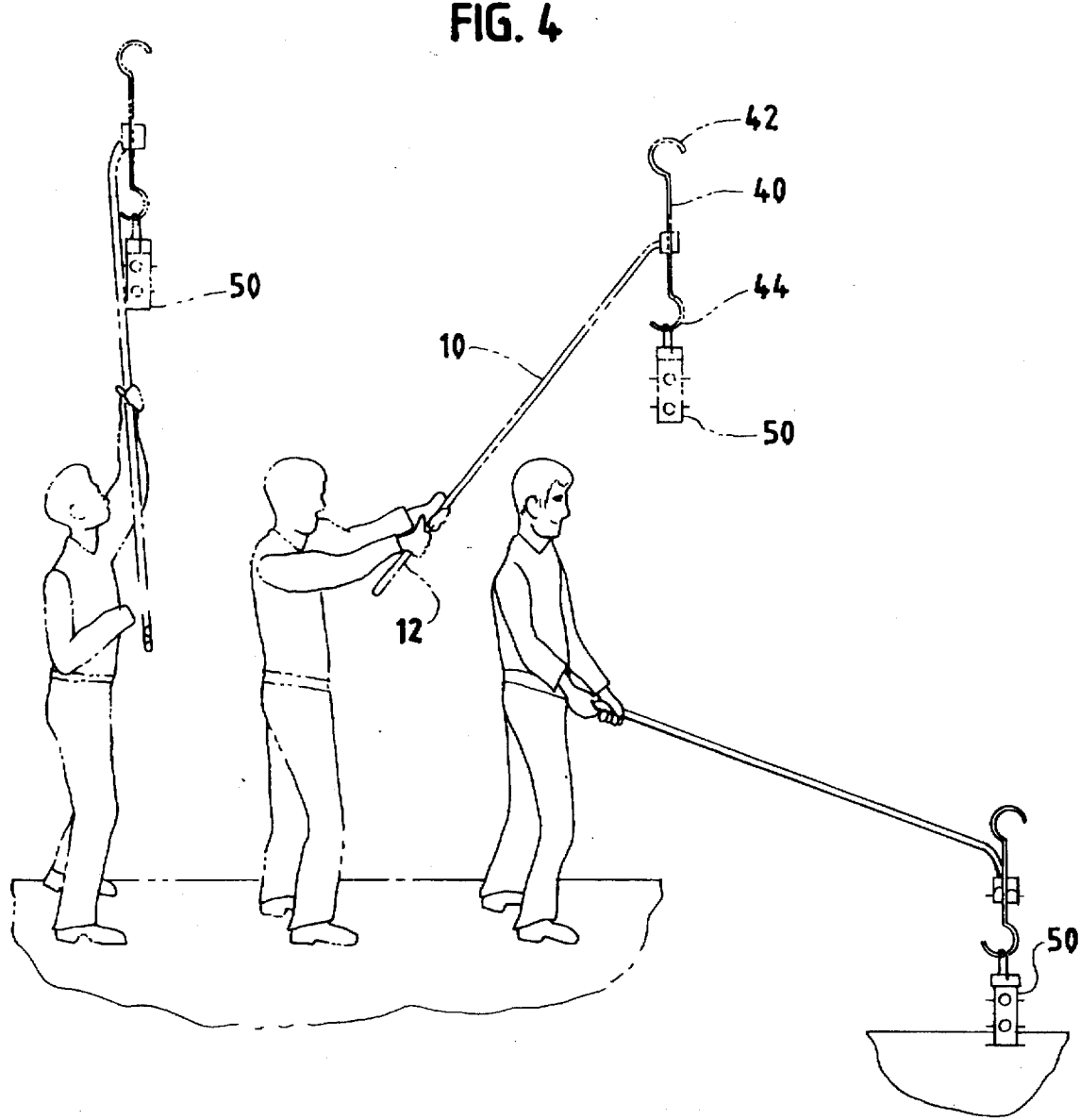
FIG. 4 illustrates how the catch mechanism and stop of the present invention cooperate to maintain the feeder's vertical alignment irrespective of the pole's position.

As shown in FIGS. 1 and 4, the present invention includes a pole 10 having a handle portion 12 and an opposingly located catch mechanism 20 that is affixed to a distally located curved portion 11 of pole 10. As further shown, catch 20 includes an aperture 22 which accepts a pin or fastener 24 that is used to affix catch 20 to pole 10. Moreover, pin or fastener 24 also permits the rotational movement of catch 20 about axis 26. Catch 20 further includes a U-shaped jaw 28 having a bottom portion 29 located therein.

Figure 2:
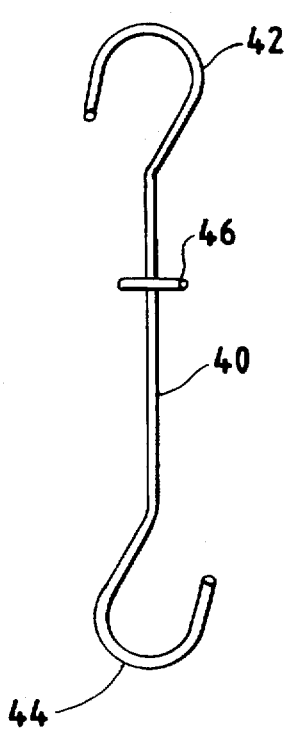
FIG. 2 is a perspective view of one embodiment of the invention showing a hanger having a stop that is adapted to cooperate with the catch mechanism shown in FIG. 1.
Figure 3:
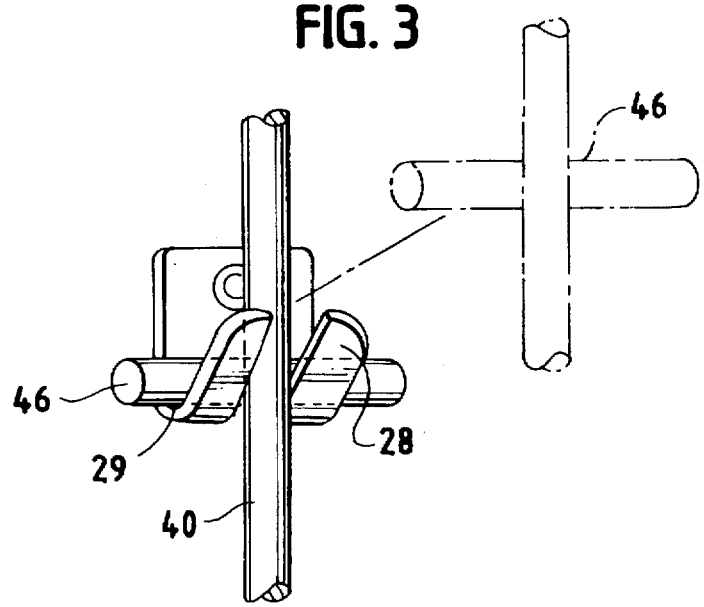
FIG. 3 is an exploded perspective view illustrating the retention of the hanger in the catch.

As shown in FIG. 2, the invention also includes a hanger 40 that has a first end portion 42 that is curved in order to facilitate its attachment to a supporting object or surface such as a tree limb. Of course, persons of ordinary skill in the art would recognize that end 42 may be configured in other ways to facilitate its attachment to a supporting structure.

As further shown, hanger 40 includes an opposingly located second end portion 44 which is used to secure an object 50, which may be a bird feeder, bird house or some other object, to hanger 40. While end 44 of hanger 40 is shown as being a hook that allows objects to be releasably connected, persons of ordinary skill in the art would also appreciate that end 44 may be permanently affixed to object 50 as well.

Also located on hanger 40 is stop 46. As shown in FIG. 2, it is located between ends 42 and 44, with a preferred position being an equal distance between the two ends.

In operation, end 44 of hanger 40 is first attached to object 50. Then, stop 46 is positioned in jaw 28 of catch 20. Once this connection is made, the hanger is securingly retained by catch mechanism 20 and pole 10 may then be used to lift hanger 40 and attached object 50 for attachment to the desired support object.

As shown in FIG. 4, as the height of object 50 increases, pole 10 will travel from a generally downward position to a generally vertical or upright position. Since catch mechanism 20 freely rotates about axis 26, hanger 40 and attached object 50 remain in a vertical position during the entire lifting procedure thereby maintaining stop 46 securely within catch 20. In fact, I have found that my invention will maintain the vertical positioning of the hanger and object even if object 50 is swung through a 360 degree arc. Although as shown in FIG. 4, object 50 typically travels through a 90 degree arc during positioning with the pole often traveling in an arc of approximately 135 degrees.

Maintaining the vertical position of the object during placement is important since it is a safer method by which to place a feeder, which may contain several pounds of feed, several feet over the head of the user. Maintaining the vertical position not only keeps the stop securely in the catch, the rotational movement of the catch prevents the stop from inadvertently slipping out of the catch when the pole is held at an angle.

Maintaining the vertical position of the feeder and hanger further promotes safe use by preventing the contents of the feeder from shifting during the placement of the object. Again, in situations where the pole is held at an extreme angle, the contents of the load may shift during placement causing the feeder to topple off the pole if the feeder is also held at a similar angle. This, again, may result in harm to the user or damage to the object.

Figure 5:
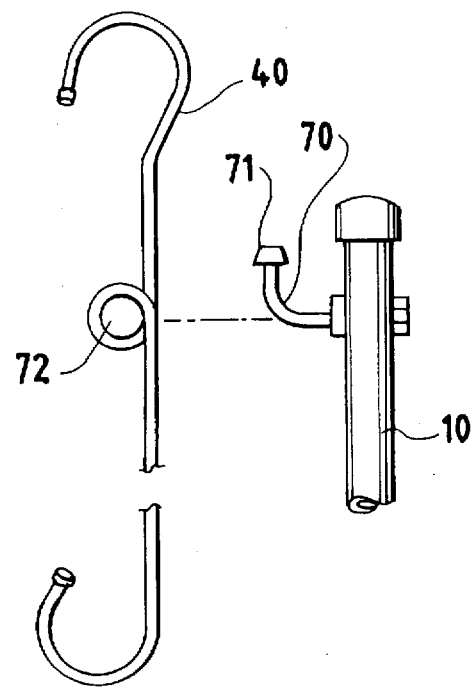
FIG. 5 is a perspective view of an alternate embodiment of my invention.
Figure 6:
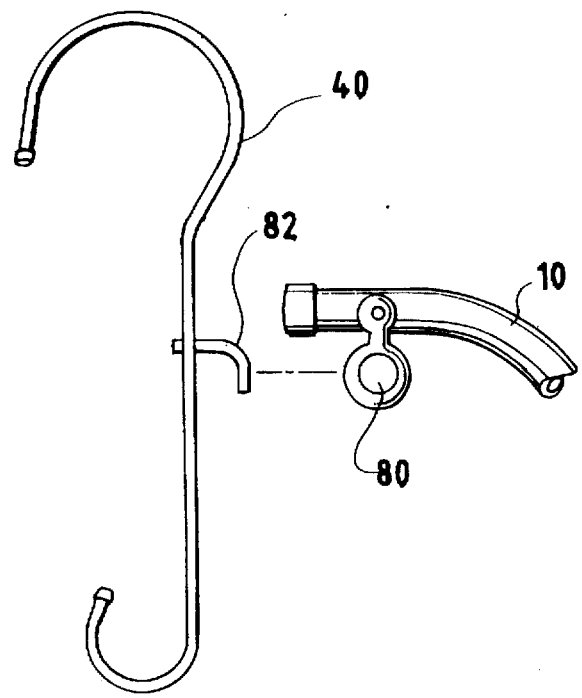
FIG. 6 is a perspective view of yet another embodiment of my invention.

FIGS. 5 and 6 show alternate embodiments of my invention which also maintain the vertical position of hanger 40 and object 50. As shown in FIG. 5, one embodiment includes a projection 70 having a stop 71 which is located at the distal end of pole 10 and aperture 72 located on hanger 40. In operation, projection 70 is inserted through aperture 72 prior to performing the necessary step to position the object and hanger on the support. Vertical positioning of object 50 is maintained by the operative engagement of projection 70 and aperture 72 which permits the hanger to rotate about projection 70. To prevent unwanted disengagement, projection 70 may have an upward bend to it as shown in FIG. 5.

As shown in FIG. 6, aperture 80 may be located on pole 10 while hanger 40 may include a projection 82. Again, this embodiment operates by inserting projection 82 through aperture 80, with the vertical positioning being maintained by the rotation of hanger 40 about projection 82 via the engagement of projection 82 and aperture 80. Lastly, to prevent unwanted disengagement, projection 82 should have downwardly directed curve as shown in FIG. 6.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A device for attaching an object to an overhead support comprising:
   a hanger having opposingly located first and second end portions and a stop located between said first and second end portions of said hanger;
   said first end portion adapted to releasably engage said support;
   said second end portion adapted to engage said object;
   a pole having a handle and an opposingly located rotatable catch having a U-shape and a bottom portion in which said stop rests;
   said catch adapted to operatively engage said stop; and
   said object maintained in a vertical position during the attachment of said object to said support by the rotational movement of said catch.

* * * * *